United States Patent [19]

Crone, Jr. et al.

[11] Patent Number: 4,553,499

[45] Date of Patent: Nov. 19, 1985

[54] METHOD AND APPARATUS FOR THE PRODUCTION OF EXHAUST GAS FILTERS

[75] Inventors: John M. Crone, Jr., Fishkill; Erven J. Kuhlmann; Matthew A. McMahon, both of Wappingers Falls; all of N.Y.

[73] Assignee: Texaco Inc., White Plains, N.Y.

[21] Appl. No.: 604,187

[22] Filed: Apr. 26, 1984

[51] Int. Cl.$^4$ .......................... B05C 3/04; B05C 3/09
[52] U.S. Cl. ................................. 118/428; 118/429; 422/238
[58] Field of Search ............... 422/238, 239; 118/426, 118/429, 428; 204/284, 285

[56] References Cited

U.S. PATENT DOCUMENTS 715,281  12/1902  Matthews et al. ............. 118/426 X

Primary Examiner—Evan K. Lawrence
Attorney, Agent, or Firm—Robert A. Kulason; James J. O'Loughlin; Robert B. Burns

[57] ABSTRACT

Method and apparatus for forming a coating material, and for depositing the material onto the surface of an article or a substrate. The apparatus includes a tank within which the coating composition is formed together with a residual amount of gas. The tank and the internal support members are electrically segregated from a perforated container with reactant material held on the internal support to avoid the formation of gas bubbles on the surfaces of the tank and support which are immersed into the coating composition.

7 Claims, 2 Drawing Figures

METHOD AND APPARATUS FOR THE PRODUCTION OF EXHAUST GAS FILTERS

BACKGROUND OF THE INVENTION

In recent years, governments have become increasingly aware of the dangers to public health, resulting from exhaust fumes of internal combustion engines, particularly in confined spaces. Among the constituents of exhaust gases which give rise to concern are carbon monoxide, incompletely burnt hydrocarbons, nitrogen oxides and lead containing particulate matter. Regulations have been issued in many countries to reduce the amount of such emissions in exhaust gases. Attempts have also been made to satisfy the requirements of such regulations in several ways including:

(a) Internal combustion engines have been designed so that they operate in such a manner as to produce an inherently "cleaner" exhaust, (b) Gasoline in which the added lead content is reduced or absent, is being sold on a wider scale than previously, and is mandatory in many areas, (c) Attempts have been made to filter the exhaust, or to provide a catalyst which would lead to a more complete combustion of carbon monoxide and unburnt hydrocarbons.

While progress has been made with the first two of the methods set out above, they have the disadvantage that the development of a completely new engine for motor vehicles is extremely expensive. Thus, manufacturers would wish, as far as possible, to continue to produce engines whose development has already largely been carried out. In addition, the production of lead-free petrol means that refineries would need to be run in a less efficient manner. Further, said refineries use more crude oil than is possible when the octane rating of lower octane hydrocarbons can be increased by the inclusion of lead compounds.

In the instance of diesel engines, under normal operation they generate large amounts of particulate carbon. The latter are discharged into the atmosphere as a heavy, black exhaust stream.

At higher exhaust temperatures, the carbon is burned off. At lower temperatures, such as under idling conditions, the relatively cool temperature precludes such action.

DESCRIPTION OF THE PRIOR ART

U.S. Pat. No. 3,231,520 and British Pat. No. 1,058,706 disclose a structure comprising a substrate having an adherent film or layer of alumina formed thereon. This layer serves as a support for catalytic materials to promote a variety of reactions including the oxidation of exhaust gases from internal combustion engines.

The alumina film is formed on a substrate of a metal or non-metal which can have a variety of configurations. The adherent alumina film is formed by contacting the substrate with a solution of an alkali metal aluminate thereby forming a hydrated film of alumina on the substrate. The layer is then dried and calcined to produce a hard tenacious film of predominantly gamma alumina.

U.S. Pat. No. 3,227,659 discloses that the alumina-coated structure of U.S. Pat. No. 3,231,520, in addition to being a useful support for catalysts, can be impregnated. When the latter material comprises a phosphorus-containing element such as an alkali metal phosphate, it is useful for the treatment of exhaust gases containing lead-containing particulate matter.

U.S. Pat. No. 3,140,651 discloses that this structure can be impregnated with a chromium-containing material, such as an alkali metal or an alkaline earth metal chromate, for treating exhaust gases containing lead-containing particulate matter. U.S. Pat. No. 3,362,783 discloses a useful configuration of the alumina-coated structure wherein the substrate comprising metal wool is encased in a metal casing prior to coating with the alumina film. Thus, the alumina coats not only the metal fibers, but also coats the casing thereby bonding the metal fibers to the inside of the casing.

The latter structure was effectively employed in the treatment of exhaust gases when it was coated or impregnated with an oxidation catalyst. These alumina coated structures have the ability to withstand severe abrading and vibration which makes them particularly useful as a catalyst support for the treatment of automobile exhaust gases. Further use of these structures in this or other services may be desirable.

British Pat. No. 1,271,710 shows that alumina coated substrates containing no catalyst, can also be used on their own for the treatment of exhaust gases. It was found that the alumina coated substrate itself acted as a filter to remove lead-containing particulate matter from an exhaust gas stream. The filter could then be subjected to further treatment in a second stage or step, using a suitable oxidation catalyst, without this oxidation catalyst being rendered inactive by the lead.

In preparing the alumina-coated substrates in accordance with the various patents described above, it was usual to deposit the alumina by immersing the substrate in a liquid coating mixture.

A preferred method for forming the coating solution is by contacting high purity particulated aluminum with an aqueous sodium hydroxide solution. This is represented by the equation:

$$2\ Al + 6\ H_2O = Al_2O_3 \cdot 3H_2O + 3H_2.$$

Physically, the high purity particulated aluminum is held in a perforated container preferably one made of metal wire mesh to form a basket. The aluminum containing baskets are lowered into the sodium hydroxide solution held within a tank whereby to initiate the alumina oxide forming reaction.

The alumina oxide is thus deposited onto the articles to be coated in the form of the trihydrate.

The substrate is generally formed from knitted metal mesh or wire, but could also comprise other forms, such as balls, bars, chains, plates or tubes. Generally, the alumina was deposited from a solution of an alkali metal aluminate. This can easily be generated as noted above by dissolving aluminum metal in an aqueous solution of an alkali metal hydroxide, most usually sodium hydroxide.

Generally, the film of aluminium oxide is at least 1 mil (0.025 mm) in thickness, and is preferably not less than about 10 mils (0.25 mm). Preferably, a film thickness of from 10 to 100 mils (0.25 to 2.5 mm) is suitable.

After drying, the coated substrate is generally calcined at a temperature which is usually within the range of 285° to 820° C., more preferably from 540° to 820° C. This treatment drives off water of crystallization, and coverts the aluminum oxide into the gamma-phase, which has a high surface area per unit weight and is very adsorptive.

The processes described in the prior art, and herein, were found to be satisfactory for the manufacture of exhaust gas cartridges. However, an additional problem is experienced that will affect the production as well as the quality of the applied coating.

More specifically, with the above noted oxidation reaction process which takes place to form the coating composition, an excessive amount of electrons are formed at the surface of the particulated aluminum pellets. Normally it would be expected that all the electrons from the oxidation of the aluminum would reduce the water at the surface of the aluminum pellets. The latter, however, is not found to be true.

Since the aluminum pellets are in electrical contact with the metallic wire containers in which said pellets are held, and since the latter are in direct electrical contact with the support structure and the tank walls, an unavoidable flow of electrons will pass from the pellets, to the tank walls even as the latter are being coated.

Based on the equation given above, the actual reaction within the coating tank is felt to occur in accordance with the following:

$$Al + NaOH + H_2O \rightarrow NaAlO_2 + 3/2 H_2 \qquad (1)$$

$$NaAlO_2 + 2H_2O \rightarrow Al(OH)_3 + NaOH \qquad (2)$$

overall $$Al + 3H_2O \rightarrow Al(OH)_3 + 3/2 H_2 \qquad (3)$$

Since equation (3) represents an oxidation-reduction reaction, it is composed of the following half reactions:

$$2H_2O + 2e \rightarrow 2OH^- + H_2 \qquad -0.828v. \qquad (4)$$

$$Al + 4OH^- \rightarrow H_2AlO_3^- + H_2O + 3e \qquad +2.35 v. \qquad (5)$$

to combine (4) and (5)

$$2\ Al + 8OH^- + 6\ H_2O \rightarrow 6\ OH^- + 3H_2 + 2\ H_2AlO_3^- + 2H_2O \qquad (6)$$

in simpler form, (6) can be written as:

$$2\ Al + 2\ OH^- + 4\ H_2O \rightarrow 2\ H_2\ AlO_3^- + 3H_2 \qquad (7)$$

or $$2\ Al + 2\ NaOH + 4\ H_2O \rightarrow 2\ NaAlO(OH)_2 + 3H_2 \qquad +1.52v. \qquad (8)$$

The released electrons can affect the half reaction without any substantial problem occurring on the support trays within the tank, or on the tank walls. However, when an alumina coating builds up on the tank wall, hydrogen is trapped and cannot be released to the solution. The gas therefore forms a bubble beneath the alumina coating, which when said bubble breaks, tends to shatter the coating which has accumulated thereon. The coating flakes or fragments are thus displaced from the tank walls and fall to the floor thereof.

Although most of the flakes will by and large fall to the tank floor, at least some will contact the surface of the substrate being treated. These flakes will not only give the coated substrate a distressed appearance, they can also enter the tank circulating system and be a deterrent to easy circulation of the coating material.

It is therefore an object of the invention to provide a more effective and efficient apparatus for applying a desired coating to an article when the latter is submerged into a bath of the coating material.

A further object is to provide an improved surface coated product by eliminating the possibility of flaked particles of the coating material contacting the surface to be coated.

A still further object is to provide a coating apparatus for holding a liquid coating composition and including means to electrically insulate the internal parts thereof to avoid flaking of solidified coating from the structure's inner walls.

The above stated objects of the invention are achieved through use of the present apparatus in a method for the production of exhaust gas filters which are immersed in a coating solution. The latter is produced by the decomposition of alumina hydrate from an alkali metal alumina solution.

The method further comprises mounting a plurality of substrates particles to be coated onto a stand or holder. Thereafter, the supported articles are immersed in the alkali metal alumina solution held within a vessel or tank, for a set period of time.

Concurrently, the formation of hydrogen bubbles along the walls of the coating vessel or tank is minimized or eliminated. The latter step precludes the possibility of said coating flaking from the vessel walls to interfere with a satisfactory article coating process.

It is possible therefore to coat the various substrates and to insert the coated substrate within a metal casing to form the desired filter structure. It is preferred, however, to insert the substrate which is preferably made from a metallic wire or the like, within the casing before immersing the stand, and the filled casings into the alkali metal alumina coating solution.

DESCRIPTION OF THE PREFERRED EMBODIMENT

Figure 1:
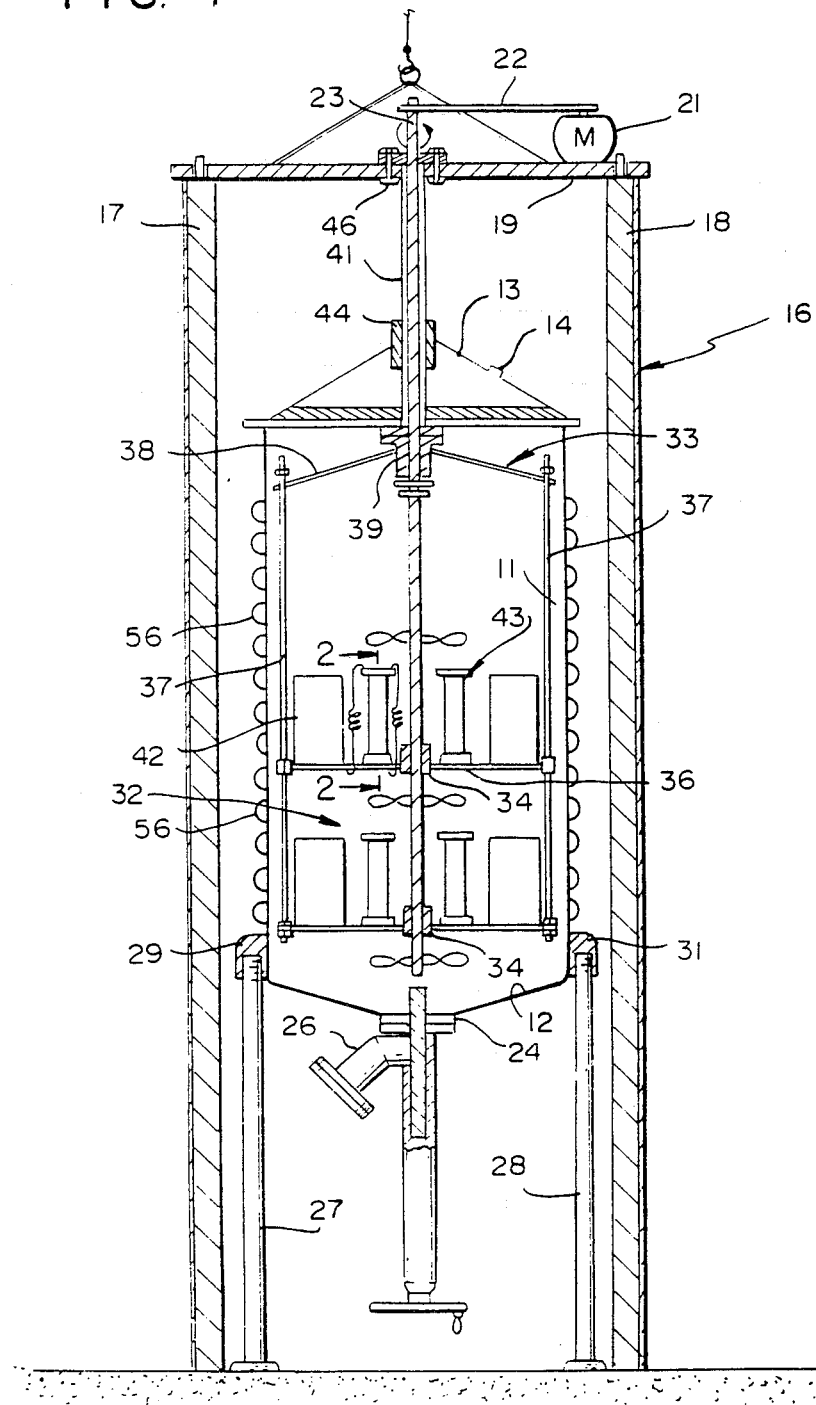
FIG. 1 is an elevation view in cross-section of an apparatus herein disclosed.

As shown in FIG. 1, one embodiment of an apparatus capable of achieving the desired coating, is comprised of an elongated upright tank 10 which includes a cylindrical wall 11 to which a floor or lower end closure 12 is fastened. A cap or top closure 13 is removably supported at the tank upper end to allow access to the interior. Cap 13 is vented by valve 14 to the atmosphere or to a collecting means whereby to collect gases which are produced during the internal reaction, thus controlling the tank pressure.

Tank 10 is positioned within a support structure or frame 16 comprised of a plurality of upstanding legs 17 and 18. The latter are mutually connected by a transverse member 19 to give the overall unit adequate stability. Said structure 19 support a drive motor 21 having a transmission element 22 which engages the apparatus main drive shaft 23.

The tank floor or lower closure 12 includes a drain pipe 24 having a laterally extending branch 26 which communicates with a pumping system to collect coating mixture from tank 10. A plurality of legs 27 and 28 which fasten into leg sockets 29 and 31 respectively, serve to elevate the tank to a desired working height.

A steam or hot water heating coil 56 is wrapped about the outer surface of wall 11, which coil is communicated with a source of steam whereby to regulate the temperature of the internal mixing and coating operation.

Internally, tank 10 defines a cylindrical compartment 32 which is of a sufficient volume to hold a quantity or pool of the coating liquid. The inner surface of wall 11 is spaced adjacent to a composite support rack 33 which is removably positioned therein.

Rack 33 includes central column or shaft 23 which functions as the main shaft, having a series of hubs 34 spaced therealong. Each of the latter supportably engages an outwardly extending tray 36 that extends to, but is spaced from the tank side walls 11.

Support rack 33 is fabricated of a material such as steel or the like being formed to minimize overall weight and still permit it to function as a support member. A plurality of longitudinal columns 37 extend through the periphery of the various trays 36 to provide mutual support. Each of said column members 37 is connected through a radial arm 38 to a main hub 39 which is carried on shaft 23.

A cylindrical sleeve 41 extends between the main hub 39 and transverse member 19, being fastened to the upper enclosure or cap 13 at hub 44 and flange 46. Said sleeve 41 surrounds and encloses central shaft 23. Said main shaft 23 upper end is operably engaged with transmission member 22 which, as noted, extends to drive motor 21. The function of the latter is to rotate the main shaft at a desired speed to afford a controlled degree of circulation to the internal coating liquid by turning mixing blades 35.

Each of the horizontal trays 36 is provided with means for holding a filter, or a mass of filter media 42 to be coated. The trays are further provided with a container 43 or suitable holding means adapted to retain the particulated aluminum in the form of pellets, rods, etc., whereby to produce the coating composition when reacted with the aqueous sodium hydroxide solution.

These aluminum holding containers 43 as noted, are so formed to allow maximum contact between the circulated sodium hydroxide solution and the aluminum pellets, and yet assure a substantially uniform coating upon the substrate or filter which is immersed in the coating solution.

Containers 43 can assume the embodiment of screening, wire mesh, expanded metal, or similar metal configurations which allow for a maximum degree of circulation therethrough. Further, they may be formed of a plastic material which is rigid enough to hold a shape and contain the aluminum. They could also be formed from ceramic, glass, wood or other material with electrical insulating capability.

To provide the desired electrical isolation of the aluminum containers 43 from the interior of the coating apparatus, the container is mounted in a manner to insulate it from the inner surface of wall 11 as well as from rack 33.

Figure 2:
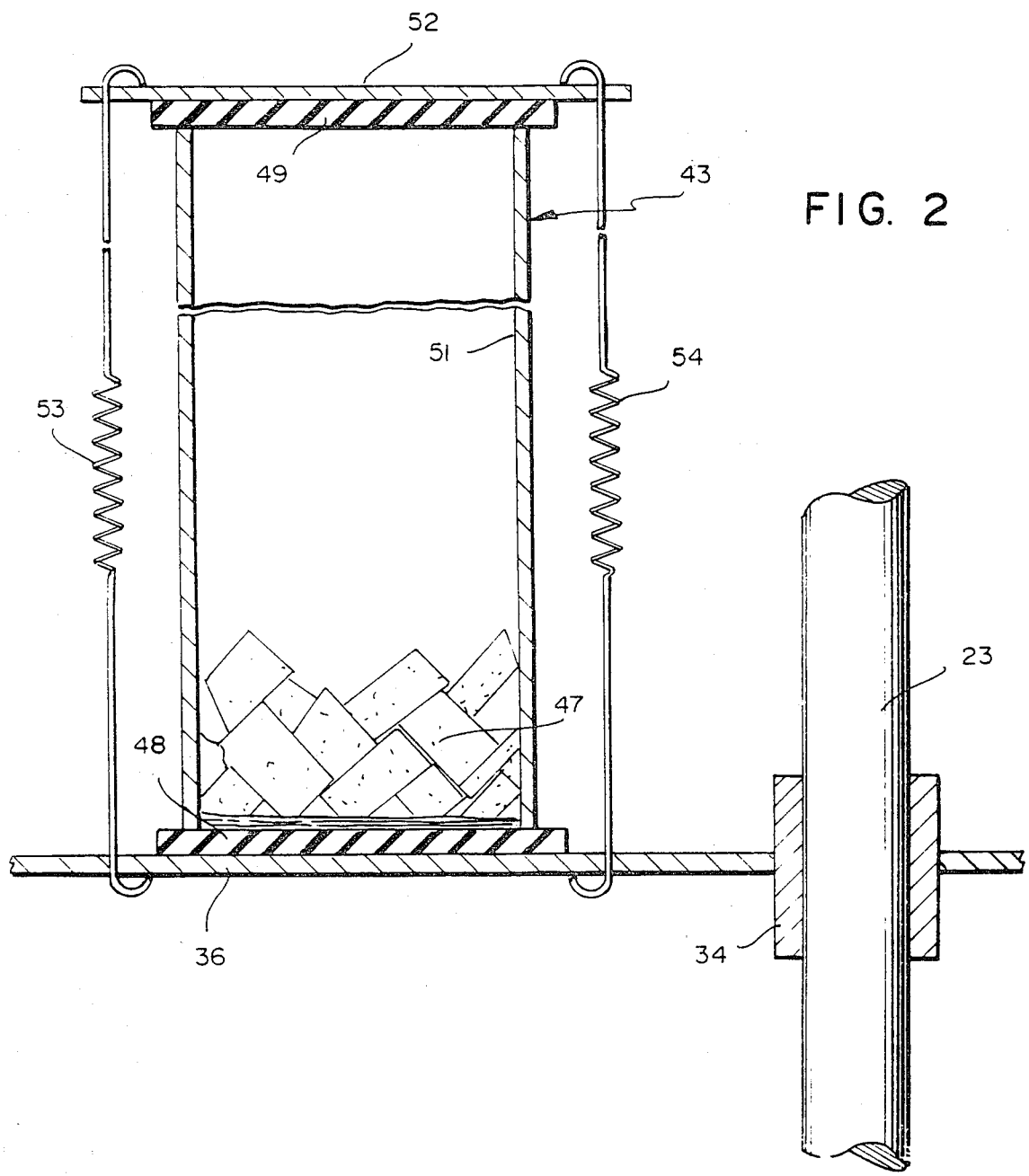
FIG. 2 is a cross-sectional segmentary view on an enlarged scale of a section of the apparatus of FIG. 1.

In one embodiment, and as shown in FIG. 2, container 43 is comprised as noted of a perforate or a screen-type wall 51 which holds loosely packed aluminum pellets 47. The container is spaced from, yet fastened to support trays 36 by a foundation pad 48. Said pad is characterized primarily in that it is electrically non-conductive. It thereby forms a barrier to electrons which would otherwise flow from the aluminum pellets 47 by way of the container wall 51, to tray 36, thence along rods 37, arms 38 and flange 39, into the inner walls 11 of tank 10.

Lower foundation pad 48 can be fabricated of a number of materials in accordance with the invention. Preferably, however, it is formed to define a compressible, yet yieldable base in the manner of a foam rubber sheet.

The enclosing wall 51 can then be urged at least partway into the surface of foundation pad 48. A similar, although perforated pad 49 forms a non-electrically conductive top closure to wall 51, the latter being maintained in place by a bar 52 positioned transversely of pad 49.

A pair of spaced apart tension springs 53 and 54 extend between the opposed ends of bar 52, downwardly to tray 36. The springs thereby form a resilient biasing force to maintain the aluminum holding container removably in place on tray 36, during a coating operation.

Operationally, in utilizing the presently disclosed apparatus, support rack 33 is initially provided with a number of containers 43 which are removably fastened to the respective vertically spaced trays 36. Each container 43 is thus provided with a predetermined amount of aluminum which is loosely confined within the enclosing walls 51.

The respective containers are positioned on tray 36 at an appropriate location from shaft 23, and the upper or closure pad 49 is laid against the upper edge of wall 51 to urge pad 48 and container 43 into a fixed position.

Thereafter transverse bar 52 is laid in place, with the ends extending beyond the upper pad 49 edge. The entire unit is biased into engagement by positioning tension springs 53 and 54 at the overhung end of the bar, connecting the lower end of the spring into tray 36.

It is appreciated that during a coating operation, the metallic connection between the respective hold down springs, bar 52 and tray 36 will become coated in a manner similar to the filter or the filter media held in container 43. However, in that the coating will be relatively thin, springs 53 and 54 can be displaced from their holding position by the application of a minimal force sufficient to break the coated joint.

In accordance with the herein described procedures, after filter container 42 and aluminum container 43 are fixed in place, the entire support rack 33 is lowered into the tank 10 to be positioned as shown in FIG. 1. Thereafter, with the addition of a measured amount of sodium hydroxide solution into the tank, the cap 13 is fastened into place and main shaft 23 is actuated into rotation.

As hereinbefore noted, while the reaction within the tank 10 takes place, the coating material will be deposited on the exposed surfaces of the filter media. However, the flow of excessive electrons which are released at the surface of the contained aluminum pellets 47, will be deterred from flowing from the various holders 43 and toward the inner surface of wall 11.

We claim:

1. An apparatus for reacting aluminum with an alkali solution to form a coating composition which is deposited onto a filter substrate, and during which reaction residual electrons are released at the surface of the reacted aluminum, which apparatus includes:

a tank for holding a quantity of the alkali solution;

a mounting frame removably received in said tank to be immersed in the coating composition, and for holding the filter substrate;

a perforate wall container carried on said frame for holding discrete particles of the reactant aluminum, said perforate wall container being electrically isolated from the tank and mounting frame respectively, whereby to avoid the formation of bubbles at the tank wall and the subsequent flaking of coating segments as a result of said bubble formation; and a non-electrically conductive means interposed between said perforate wall container and said frame, which spaces the container from the mounting frame.

2. The apparatus as defined in claim 1, wherein said non-electrically conductive means comprises a pad formed of an electrically non-conductive material.

3. The apparatus as defined in claim 1, further including biasing means removably urging said perforate wall container into engagement with the mounting frame.

4. The apparatus as defined in claim 1, wherein said pad is formed of foam rubber.

5. The apparatus as defined in claim 1, wherein said mounting frame includes:

at least one support tray;

said peforated wall container removably positioned on said tray and including an electrically insulated foundation pad as said non-electrically conductive means disposed intermediate the container bottom and said tray; and spring means engaging the tray and perforate wall container respectively to bias said members into tight engagement with said non-electrically conductive means therebetween.

6. The apparatus as defined in claim 5, further including a second electrically non-conductive pad disposed at the container upper end, said spring means being urged against said second pad.

7. The apparatus as defined in claim 6, further including a connector bar extending transversely of the container upper end, and said spring means biasing said support tray to said connector bar.

* * * * *